United States Patent Office 2,817,668
Patented Dec. 24, 1957

2,817,668
PHTHALIDES

Donald D. Wheeler and David C. Young, Midland, Mich., assignors to The Dow Chemical Company, Midland, Mich., a corporation of Delaware No Drawing. Application April 30, 1956
Serial No. 581,338

6 Claims. (Cl. 260—343.3)

This invention is concerned with phthalides having the formula

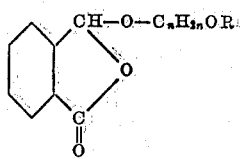

In this and succeeding formulae, R represents an aryl radical or an alkyl radical containing from 1 to 8 carbon atoms, inclusive, and $n$ is an integer from 2 to 3, inclusive. This invention also includes a method for preparing these compounds. The expression "aryl" as herein employed refers to phenyl and substituted phenyl radicals such as tolyl, biphenylyl, methoxyphenyl and chlorophenyl. These new compounds are amber colored oils or low melting solids soluble in many organic solvents such as benzene, toluene and acetone, and substantially insoluble in water. They have utility as microbicides and are adapted to be employed for the control of bacterial organisms. In addition, certain of these compounds may be employed as plasticizers.

The above compounds may be prepared by causing phthalaldehydic acid to react with an appropriate hydroxy compound having the formula $$ROC_nH_{2n}OH$$

to produce the desired phthalide and water of reaction. The terms "phthalaldehydic acid" and "3-hydroxyphthalide" refer to a compound having the structure

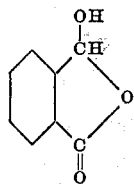

Phthalaldehydic acid is often represented in the literature as having the structure

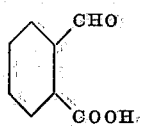

However, the acid employed in this invention and prepared as hereinafter described exists almost entirely in the closed ring, 3-hydroxyphthalide structure, as observed from a study of its infrared absorption spectrum. Infrared data also indicate the phthalide product to have the closed ring 3-hydroxyphthalide structure with open chain ester sometimes being formed as a by-product.

In the synthesis, good results are obtained when substantially equimolar proportions of each reactant are employed, however, the presence of a reasonable excess of either reactant does not interfere with the reaction. A large excess of phthalaldehydic acid, and particularly under conditions of high temperature, may form an anhydride by-product.

The reaction takes place smoothly in the temperature range of from 15° to 150° C. but a range of from 90° to 130° C. is considered preferable from a practical standpoint. Solvents, such as benzene and toluene may be employed, if desired, as reaction medium. Stabilizers and antioxidants, such as p,p'-isopropylidenediphenol, which are oftentimes added to the product when the latter is employed as a plasticizer may be incorporated during the synthesis, if desired. The product obtained is separated from the water of reaction by vaporization of the latter.

In a preferred method of carrying out the reaction, phthalaldehydic acid and an equimolar proportion or a small excess of the appropriate hydroxy compound are mixed and heated until the water of reaction begins to reflux, and thereafter maintained under reflux for from 0.5 to 4 hours. The mixture is then allowed to cool and poured into water whereupon an oil precipitates forming an organic phase and an aqueous phase. The organic phase is extracted from the mixture with benzene. If desired, the aqueous phase may be decanted prior to extraction with benzene. The benzene solution is then heated to distill water and solvent and to obtain the desired phthalide product as residue.

In an alternative method, the reactants are mixed and heated in the desired temperature range under reflux for from one to three hours. At the end of this period, the pressure on the system is reduced to about 15 millimeters and the reaction mixture slowly heated to a final temperature of about 150° C. to remove volatile material and to obtain as residue the desired phthalide product. If desired, a slow stream of nitrogen may be introduced into the reaction mixture to aid in the removal of volatile material.

The following examples illustrate the invention but are not to be construed as limiting.

*Example 1.—3-(2-(2-biphenylyloxy)ethoxy)phthalide*

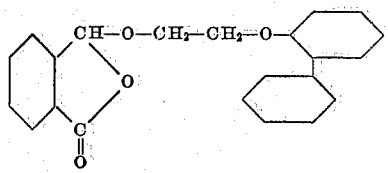

214 grams (1.0 mole) of 2-(2-biphenylyloxy)ethanol and 150 grams (1.0 mole) of phthalaldehydic acid were mixed and heated at 120° C. under reflux for one hour. The pressure on the system was reduced to about 15 millimeters and the temperature raised to 130° C. to distill low boiling material and to obtain a viscous oily 3-(2-(2-biphenylyloxy)ethoxy) phthalide product in a yield of 34.4 grams or 95.5 percent of theoretical. The latter melted at 57°–60° C.

*Example 2.—3-(2-methoxy-1-methylethoxy)phthalide*

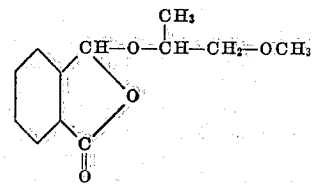

45 grams (0.5 mole) of 1-methoxy-2-propanol and 75 grams (0.5 mole) of phthalaldehydic acid were mixed and heated at 110° C. under reflux for three hours. The mixture was cooled to 85° C. and poured into 500 milliliters of water whereupon an oil precipitated. The water was decanted therefrom and the oil washed with fresh water.

The oil was then extracted from the mixture with benzene and the benzene solution heated to distill water and benzene and to obtain a 3 - (2 - methoxy - 1 - methylethoxy) phthalide product as residue in a yield of 57 grams or 51 percent of theoretical. The latter was an amber-colored oil having a refractive index $n_D^{20}$ of 1.5202.

*Example 3.—3-(2-(x-octyloxy)ethoxy)phthalide*

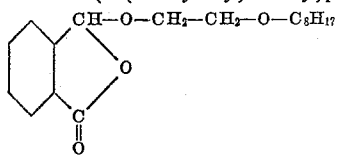

287 grams (1.65 moles) of x-octyloxyethanol (a mono octyl ether of glycol wherein the octyl group is derived from a mixture of isomeric primary octyl alcohols, and having a boiling range of 93°–103° C. at 5 millimeters pressure), 252 grams (1.68 moles) of phthalaldehydic acid and 7.5 grams of p,p'-isopropylidenediphenol were mixed and heated at 110° C. under reflux for three hours. The pressure on the system was then reduced to about 15 millimeters and the temperature raised to 140° C. to distill water of reaction. The temperature was then increased to 170° C. while the system was maintained under reduced pressure and nitrogen gas swept therethrough to remove volatile material and to obtain as residue a 3-(2-x-octyloxy)ethoxy)phthalide product in a yield of 500 grams or 96.5 percent of theoretical. The latter was an amber-colored oil.

*Example 4.—3-(2-phenoxyethoxy)phthalide*

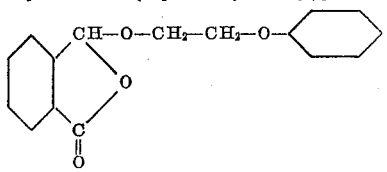

48.3 grams (0.35 mole) of 2-phenoxyethanol and 52.5 grams (0.35 mole) of phthalaldehydic acid were mixed and heated at 120° C. under reflux for one hour. The mixture was cooled and poured into 500 milliliters of water whereupon a viscous oil precipitated. The latter was extracted from the mixture with benzene and the benzene solution heated to distill water and benzene and to obtain a 3-(2-phenoxyethoxy)phthalide product as a crystalline solid residue. The latter was washed with petroleum ether, collected by filtration, and dried at about 20° C. and 15 millimeters pressure. The product melting at 90°–92° C. amounted to 71.5 grams or 76 percent of theoretical.

*Example 5.—3 - (2 - normal - butoxy - 1 - methylethoxy) phthalide*

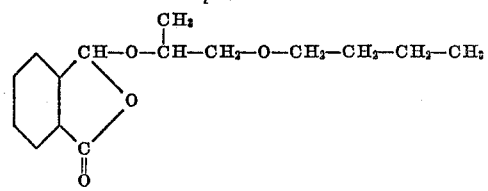

46.2 grams (0.35 mole) of 1-normal-butoxy-2-propanol and 52.5 grams (0.35 mole) of phthalaldehydic acid were mixed and heated at 120° C. under reflux for three hours. The mixture was cooled and poured into 500 milliliters of water whereupon a viscous oil precipitated. The latter was extracted with benzene and the benzene solution heated to distill water and benzene. The residue was then fractionally distilled at reduced pressure to obtain 57.5 grams (62 percent yield) of a liquid 3-(2-normal-butoxy-1-methylethoxy)phthalide product boiling from 140° to 146° C. at 3 millimeters pressure.

In similar preparations the following phthalides are prepared:

3 - (2 - (4 - biphenylyloxy) - 1 - methylethoxy)phthalide by the reaction of phthalaldehydic acid with 1-(4-biphenylyloxy)-2-propanol.

3-(3-normal-hexyloxypropoxy)phthalide by the reaction of phthalaldehydic acid with 3-normal-hexyloxy-1-propanol.

3 - (2 - (4 - ethylphenoxy)ethoxy)phthalide by the reaction of phthalaldehydic acid with 2-(4-ethylphenoxy)-ethanol.

3 - (2 - (4 - chlorophenoxy)ethoxy)phthalide by the reaction of phthalaldehydic acid with 2-(4-chlorophenoxy)-ethanol.

The novel compounds of the present invention are effective as germicides and may be employed for the control of bacterial organisms. In a representative operation, a solid nutrient agar medium saturated with 3-(2-methoxy-1 - methylethoxy)phthalide gave complete inhibition of growth when streaked with *Staphylococcus aureus* and incubated at 30° C. for three days.

The phthalaldehydic acid employed in this invention may be prepared by photochlorinating o-xylene to obtain $\alpha,\alpha,\alpha,\alpha',\alpha'$-pentachloro-o-xylene by passing chlorine gas into o-xylene while illuminating with sun lamps. The resulting chlorinated o-xylene is then heated with aqueous constant-boiling hydrochloric acid containing 10 percent ferric chloride solution to obtain phthalaldehydic acid, as more fully disclosed and claimed in a copending application of James D. Head and Owen D. Ivins, Serial Number 279,682, filed March 31, 1952, now Patent No. 2,748,162.

We claim:

1. A phthalide having the formula

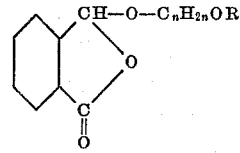

wherein R represents a member of the group consisting of alkyl radicals containing from 1 to 8 carbon atoms, inclusive, phenyl, biphenylyl, lower-alkyl-substituted-phenyl, lower-alkoxy-substituted-phenyl and halo-substituted-phenyl, and *n* is an integer of from 2 to 3, inclusive.

2. 3-(2 methoxy-1-methylethoxy)phthalide.
3. 3-(2-(2-biphenylyloxy)ethoxy)phthalide.
4. 3-(2-phenoxyethoxy)phthalide.
5. 3-(2-normal-butoxy-1-methylethoxy)phthalide.
6. A method for preparing a phthalide having the formula

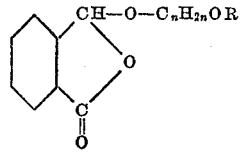

wherein R represents a member of the group consisting of alkyl radicals containing from 1 to 8 carbon atoms, inclusive, phenyl, biphenylyl, lower-alkyl-substituted-phenyl, lower-alkoxy-substituted-phenyl, and halo-substituted-phenyl, and *n* is an integer of from 2 to 3, inclusive, which comprises the step of heating phthalaldehydic acid and a hydroxy compound having the formula, $ROC_2H_{2n}OH$, wherein R and *n* are as specified above, at a temperature of from 90° to 130° C. for a sufficient time to allow completion of the reaction.

References Cited in the file of this patent

FOREIGN PATENTS 523,466    Canada _____ Apr. 3, 1956

OTHER REFERENCES

Bistrzycki et al.: Berichte 27, pages 2632–40 (1894).
Mayer et al.: Chem. Abst., vol. 24, page 838 (1930).
Bistrzycki et al.: Helv. Chim. Acta 3, page 371 (1920).